(12) United States Patent
Zhang et al.

(10) Patent No.: US 10,638,867 B2
(45) Date of Patent: May 5, 2020

(54) VACUUM JUICER

(71) Applicant: GUANGDONG HUIJUN TECHNOLOGY GROUP LIMITED, Guangdong (CN)

(72) Inventors: Zhonghua Zhang, Guangdong (CN); Xionghui Xie, Guangdong Procince (CN); Qifeng Xie, Guangdong Procince (CN)

( * ) Notice: Subject to any disclaimer, the term of this patent is extended or adjusted under 35 U.S.C. 154(b) by 482 days.

(21) Appl. No.: 15/521,620

(22) PCT Filed: Nov. 1, 2016

(86) PCT No.: PCT/CN2016/104178
§ 371 (c)(1),
(2) Date: Apr. 25, 2017

(87) PCT Pub. No.: WO2018/010341
PCT Pub. Date: Jan. 18, 2018

(65) Prior Publication Data
US 2018/0220829 A1    Aug. 9, 2018

(30) Foreign Application Priority Data

Jul. 14, 2016  (CN) .......................... 2016 1 0562131

(51) Int. Cl.
*A47J 19/02*      (2006.01)
*A47J 43/07*      (2006.01)
(Continued)

(52) U.S. Cl.
CPC ................ *A47J 19/02* (2013.01); *A23N 1/00* (2013.01); *A47J 43/046* (2013.01); *A47J 43/0716* (2013.01)

(58) Field of Classification Search
CPC .............. A47J 19/02–027; A47J 43/046; A47J 43/0465; A47J 43/0716; A47J 43/0722
(Continued)

(56) References Cited

U.S. PATENT DOCUMENTS

1,156,010 A * 10/1915 Kenney ............. F16K 31/52408
                                                251/255
3,127,786 A *  4/1964 Wooley ................... F16K 21/04
                                                 74/527
(Continued)

*Primary Examiner* — Ibrahime A Abraham
*Assistant Examiner* — John J Norton
(74) *Attorney, Agent, or Firm* — Prakash Nama; Global IP Services, PLLC (57) ABSTRACT

The invention discloses a vacuum juicer, and belongs to the field of juicers. The vacuum juicer comprises a vacuum cover assembly, a stirring cup assembly and a main unit, wherein the vacuum cover assembly comprises a vacuum cover and a cam rotating around the vacuum cover, and a sealant is arranged on the cam; the stirring cup assembly comprises a stirring cup holder and a stirring cup, and a movable valve is arranged on the stirring cup and slides up and down to control opening and closing of a stirring cup air hole; a vacuum pump in the main unit is in sealed connection with the internal space of the vacuum cover. According to the vacuum juicer, the interior of the stirring cup can be vacuumized before and during fruit juice stirring, the stirring cup can be taken out to be carried and stored in the vacuum state for a period of time, and the phenomenon that fruit juice makes contact with air and consequentially is oxidized is avoided during this period of time.

6 Claims, 9 Drawing Sheets

(51) Int. Cl.
*A23N 1/00* (2006.01)
*A47J 43/046* (2006.01)

(58) Field of Classification Search
USPC ............ 99/454, 472, 502; 251/211, 251–263
See application file for complete search history.

(56) References Cited

U.S. PATENT DOCUMENTS

| | | | | |
|---|---|---|---|---|
| 4,007,500 | A * | 2/1977 | Thompson | A47K 1/14 |
| | | | | 4/295 |
| 5,103,857 | A * | 4/1992 | Kuhn | F16K 21/04 |
| | | | | 137/315.13 |
| 6,669,170 | B2 * | 12/2003 | Kersken | F16K 35/04 |
| | | | | 251/251 |
| 2004/0173105 | A1 * | 9/2004 | Kim | A47J 43/06 |
| | | | | 99/472 |
| 2015/0201808 | A1 * | 7/2015 | Katsuki | A47J 43/042 |
| | | | | 99/489 |
| 2017/0231431 | A1 * | 8/2017 | Maeng | A47J 43/046 |
| | | | | 99/485 |

* cited by examiner

VACUUM JUICER

BACKGROUND OF THE INVENTION

The invention relates to the technical field of juicers, in particular to a vacuum juicer.

When a juicer is used for juicing vegetables and fruits, vegetable and fruit juice needs to be in the vacuum state so as to be prevented from being oxidized, and thus a vacuum juicer is required.

Traditional vacuum juicers are realized through two methods: According to one traditional vacuum juicer, the interior of a stirring cup is vacuumized before and during stirring for achieving the vacuum state, and oxygen in the juice and water can be pumped away before and during stirring of the juicer, so that the juice is prevented from being oxidized; however, the vacuum juicer has the defect that the interior of the stirring cup cannot be kept in the vacuum state after the stirring cup is taken out, oxidization occurs immediately after the stirring cup is taken out, and thus vacuum storage can only be achieved without taking out the stirring cup. According to the other vacuum juicer, a stirring cup is vacuumized after stirring for achieving the vacuum state, and vacuum storage can be achieved during carrying; however, the vacuum juicer has the defect that the vacuumizing function is not available before and during stirring, the juice has already been oxidized in the stirring process (oxygen is contained in water), and the juice can also be oxidized when poured into a storage cup from the stirring cup.

In general, the purposes of convenient carrying and keeping of vegetable and fruit juice in the vacuum state during the whole process cannot be achieved existing juicers at the same time.

The above defects are worth overcoming.

BRIEF SUMMARY OF THE INVENTION

For overcoming the defects of the prior art, the invention provides a vacuum juicer according to which the interior of a stirring cup can be vacuumized before and during juice stirring, the stirring cup can be taken out to be carried and stored in the vacuum state for a period of time, and the phenomenon that fruit juice makes contact with air and consequentially is oxidized is avoided during this period of time The technical scheme of the invention is as follows:

The vacuum juicer is characterized by comprising a vacuum cover assembly, a stirring cup assembly and a main unit, wherein the stirring cup assembly is arranged inside the vacuum cover assembly in a sleeved mode; the vacuum cover assembly is movably connected with the main unit and comprises a vacuum cover and a cam arranged on the vacuum cover, the cam rotates around the vacuum cover, and a sealant is arranged on the cam and corresponds to an air inlet in the vacuum cover; the stirring cup assembly comprises a stirring cup holder and a stirring cup, and a movable valve is arranged at a stirring cup air hole in the stirring cup and slides up and down to control opening and closing of the stirring cup air hole; a vacuum pump is arranged inside the main unit and is in sealed connection with the internal space of the vacuum cover.

Furthermore, a control handle is arranged above the cam and drives the cam to rotate.

Furthermore a positioning pin is arranged on the cam, and the lower end of the positioning pin is connected with the care through a positioning pin spring.

Furthermore, positioning pin grooves matched with the positioning pin are formed in the vacuum cover.

Furthermore, a movable valve spring is arranged do the lower side of the movable valve, the lower end of the movable valve spring is connected with the stirring cup, and the movable valve spring pushes the movable valve upwards, so that the movable valve and the cam are squeezed mutually.

Furthermore, the bottom of the cam is provided with an upward-concave groove and a downward-convex lug, and the lug is matched with a convex point at the top end of the movable valve.

Furthermore, a movable valve pad is arranged at the lower end of the movable valve.

Furthermore, the vacuum pump is connected with the internal space of the vacuum cover through a hose, and an air outlet is further formed in the vacuum pump.

According to the above scheme, the invention has the beneficial effects that: before stirring, the interior of the stirring cup can be vacuumized by closing the air inlet and opening the air hole of the movable valve; during stirring, the air inlet and the air hole of the movable valve are closed at the same time, so that the vacuum stirring environment is guaranteed; after stirring, the air inlet is opened, the air hole of the movable valve is kept closed, and then the stirring cup can be taken out to be carried conveniently under the condition that the vacuum environment is kept. According to the invention, the vacuum state of the stirring cup the stirring process can be achieved, the vacuum environment can also be guaranteed when the stirring cup is taken down, vegetable and fruit juice are kept in the vacuum state all the time accordingly, the freshness of the juice is kept, and health is guaranteed.

Description of marks in the drawings: 11, vacuum cover; 111, air inlet; 112, positioning pin groove; 12, control handle; 13, cam; 131, sealant; 132, positioning pin; 133, positioning pin spring; 134, groove, 135, lug; 21, movable valve, 211, movable valve pad; 212, movable valve spring;

22, stirring cup; stirring cup air hole; 23, stirring cup holder; 30, main unit; 31, vacuum pump; 32, hose; 33, air outlet.

DETAILED DESCRIPTION OF THE INVENTION

A further description of the invention is given with accompanying drawings and embodiments as follows.

Figure 1:
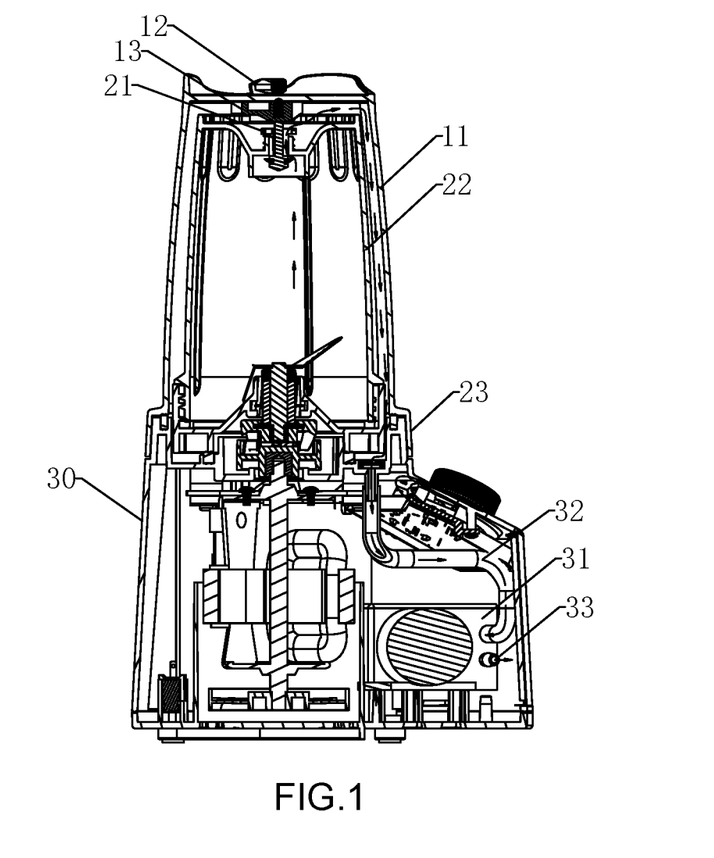
FIG. 1 is a structure schematic diagram of the invention.

As is shown in FIG. 1, a vacuum juicer comprises a vacuum cover assembly, a stirring cup assembly and a main unit 30, wherein the stirring cup assembly is arranged inside the vacuum cover assembly in a sleeved mode, the vacuum cover assembly is movably connected with the main unit 30, and a vacuum pump 31 is arranged inside the main unit 30 and is in sealed connection with the internal space of the vacuum cover assembly.

Preferably, the vacuum pump 31 is connected with the internal space of the vacuum cover assembly through a hose 32, and an air outlet 33 is further formed in the vacuum pump 31.

Figure 2:
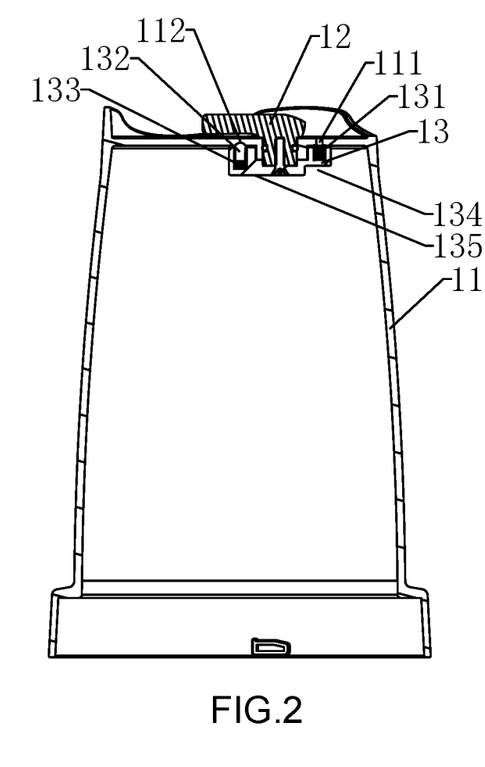
FIG. 2 is a structure schematic diagram of a vacuum cover assembly of the invention.
Figure 10:
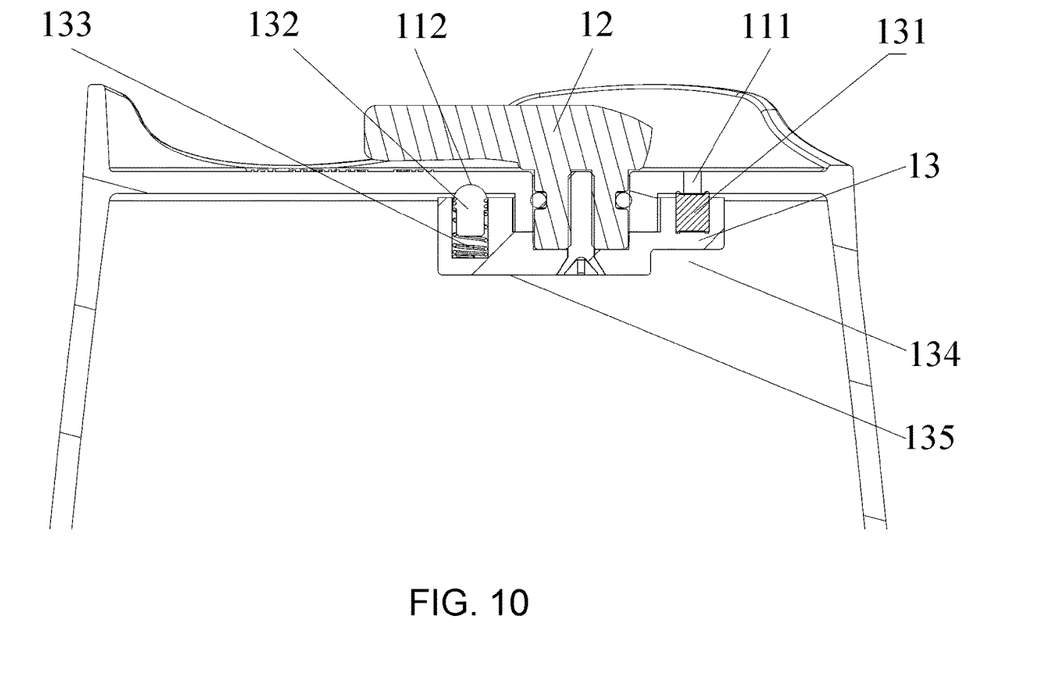
FIG. 10 is a partially enlarged view of the vacuum cover assembly.

As is shown in FIG. 2 and FIG. 10, the vacuum pump assembly comprises a vacuum cover 11 and a cam 13 arranged on the vacuum cover 11, and a control handle 12 is arranged above the cam 13 and drives the cam 13 to rotate around the vacuum cover 11. The lower portion of the cam 13 is provided with an upward-concave groove 134 and a downward-convex lug 135, and the boundary between the groove 134 and the lug 135 is in a slope shape. The groove 134 and the lug 135 are located in different positions along with rotation of the control handle 12.

A section of arc-shaped sealant 131 is arranged on the cam 13 and corresponds to an air inlet 111 in the vacuum cover 11, and along with rotation of the control handle 12, the sealant 131 makes contact with the air inlet 111 and is separated from the air inlet 111 alternately, so that closing and opening the air inlet 111 are achieved.

A positioning pin 132 is arranged on the cam 13, the lower end of the positioning pin 132 is connected with the cam 13 through a positioning pin spring 133, and a plurality of positioning pin grooves 112 matched with the positioning pin 132 are formed in the vacuum cover 11. In the rotating process of the control handle 12, the positioning pin spring 133 ejects the positioning pin 132 to enable the positioning pin 132 to be separated from or clamped in the positioning pin grooves 112 formed in the vacuum cover 11, and accordingly, the rotating angle and position of the control handle 12 are controlled.

Figure 3:
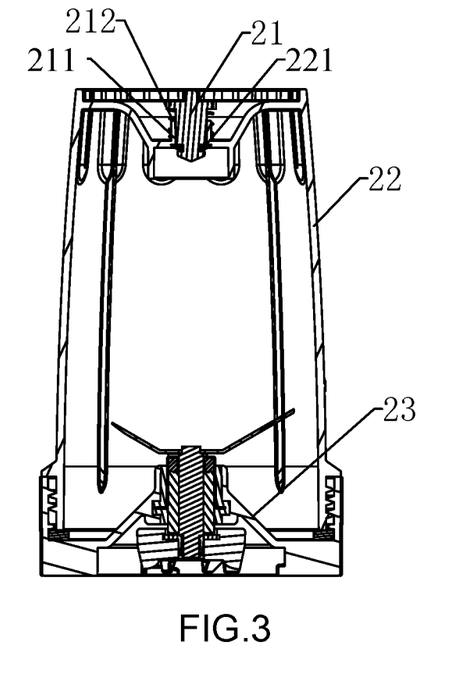
FIG. 3 is a structure schematic diagram of a stirring cup assembly of the invention.
Figure 11:
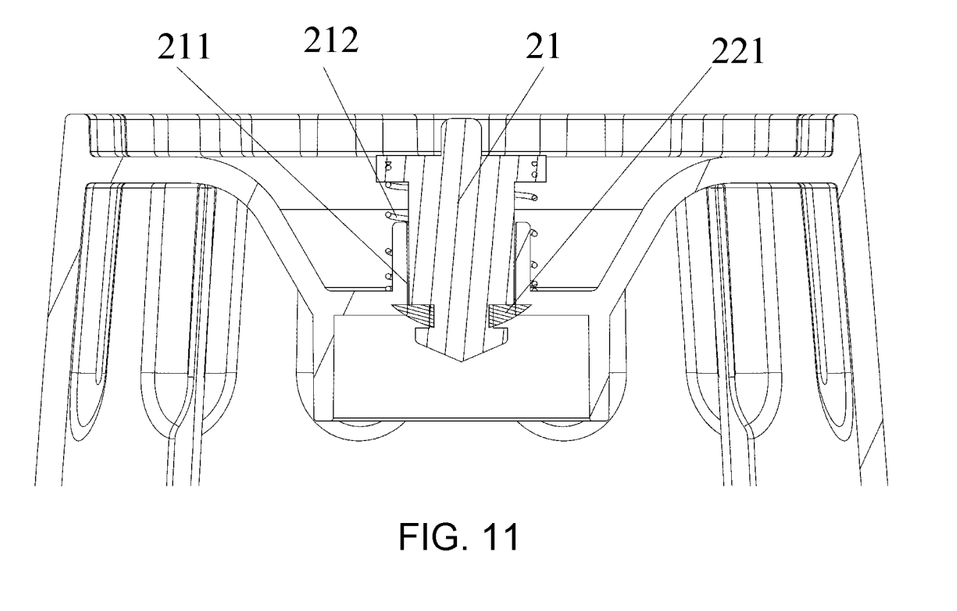
FIG. 11 is a partially enlarged view of the stirring cup assembly.

As is shown in FIG. 3 and FIG. 11, the stirring cup assembly comprises a stirring cup holder 23 and a stirring cup 22, a movable valve 21 is arranged at a stirring cup air hole 221 in the stirring cup 22, and a movable valve pad 211 is arranged at the lower end of the movable valve 21.

A movable valve spring 212 is arranged on the lower side of the movable valve 21, the lower end of the movable valve spring 212 is connected with the stirring cup 22, and the movable valve spring 212 pushes the movable valve 21 upwards, so that the movable valve 21 and the cam 13 are squeezed mutually; the lower side face of the cam 13 squeezes the upper end of the movable valve 21, the movable valve 21 is controlled to slide up and down accordingly, the movable valve pad 211 is driven to slide through up-down sliding of the movable valve 21, and thus opening and closing of the stirring cup air hole 221 are controlled.

Preferably, a convex point is arranged above the movable valve 21, and in the rotating process of the control handle 12, the convex point and the lug 135 are squeezed or separated mutually. When the convex point and the lug 135 are separated, the convex point slides into a groove 134, the movable valve 21 slides upwards, the movable valve pad 211 flakes contact with the stirring cup air hole 221, and thus the stirring cup 22 is sealed; when the convex point and the lug 135 are squeezed mutually, the movable valve 21 is pushed to slide downwards, the movable valve pad 211 and the stirring cup air hole 221 are separated, and air circulation of the stirring cup 22 can be achieved.

Figure 4:
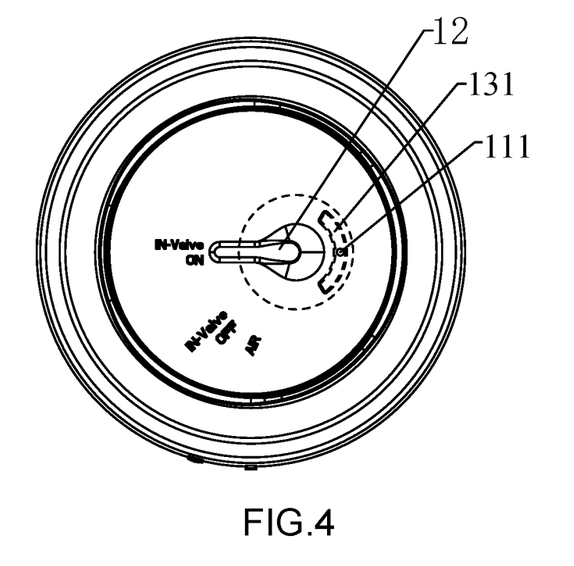
FIG. 4 is a top view of the vacuum assembly in the vacuumized state.
Figure 5:
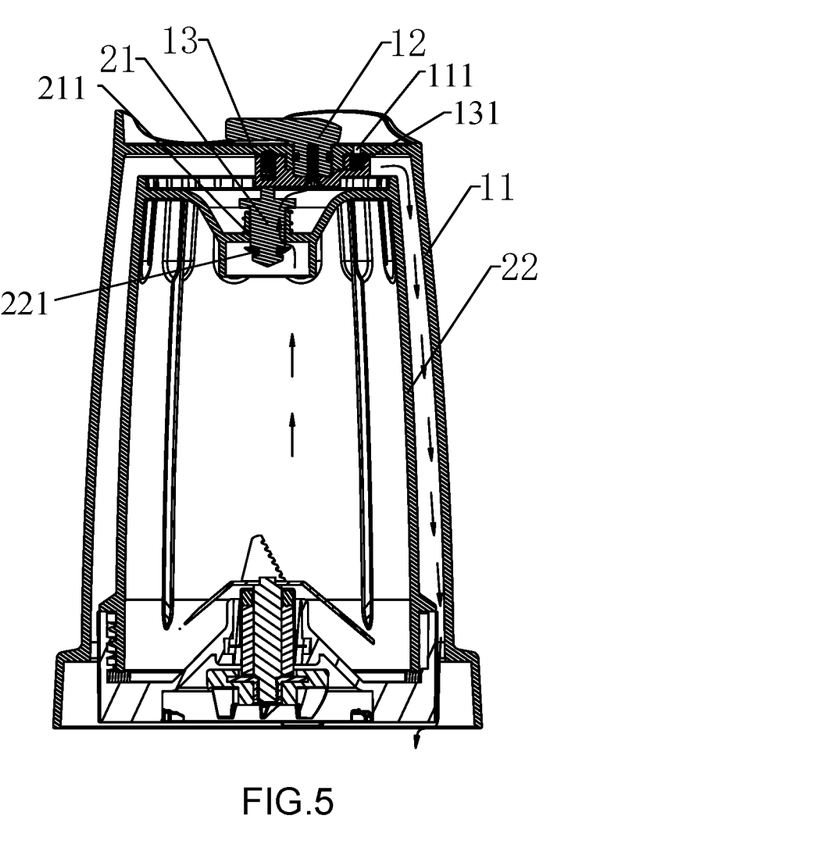
FIG. 5 is a sectional view of the vacuum cover assembly and the stirring cup assembly in the vacuumized state.

According to the application principle of the invention:

As is shown in FIGS. 4-5, in the vacuumized state, the control handle 12 is located in a first position, the positioning pin spring 133 ejects the positioning pin 132 to enable the positioning pin 132 to be buckled with the first positioning pin groove 112, the sealant 131 makes contact with the air inlet 111 at the moment, and the vacuum cover 11 is in the airtight state; the lug 135 of the cam 13 and the convex point are squeezed mutually, the movable valve 21 is pushed to slide downwards, the movable valve pad 211 is separated from the stirring cup air hole 221, a vacuumizing channel of the stirring cup 22 is opened, and air circulation of the stirring cup 22 can be achieved; the vacuum pump 31 conducts vacuumization through the hose 32, and the air flow direction is shown as the arrows in the FIGS.

Figure 6:
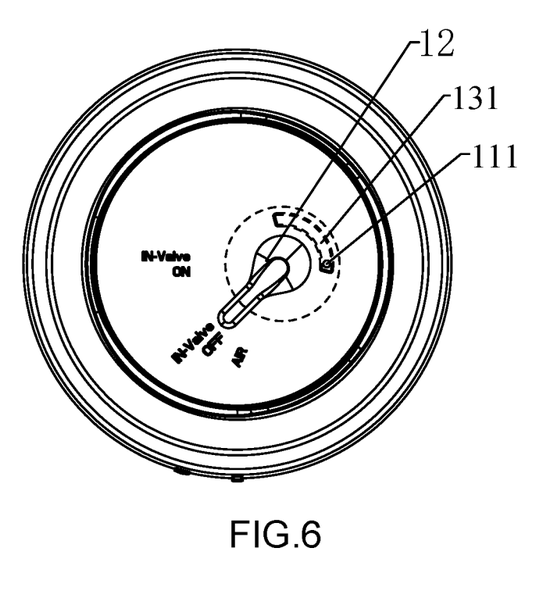
FIG. 6 is a top view of the vacuum cover assembly when both a stirring cup and a vacuum cover are in the vacuum state.
Figure 7:
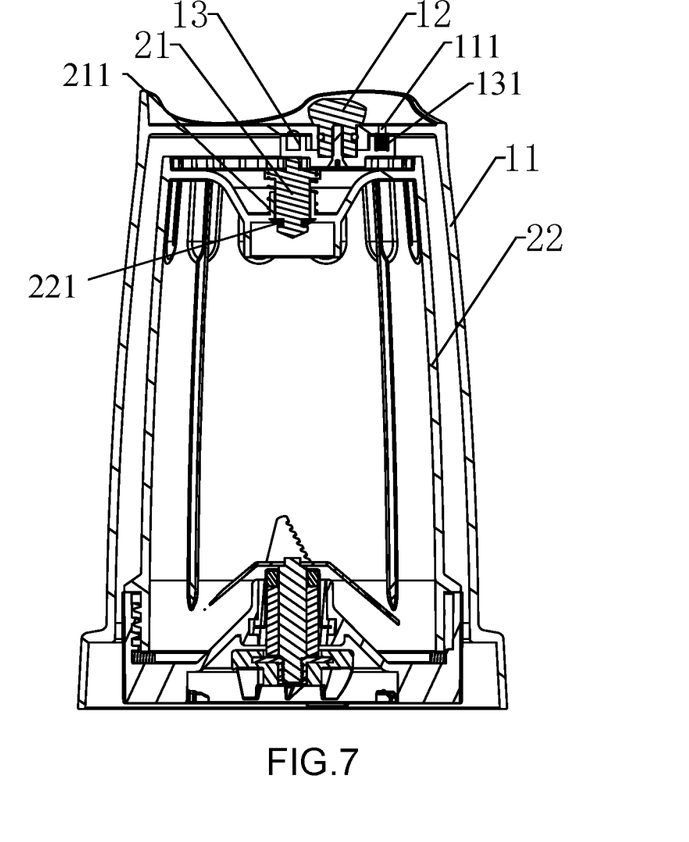
FIG. 7 is a sectional view of the vacuum cover assembly and the stirring cup assembly when both the stirring cup and the vacuum cover are in the vacuum state.

As is shown in FIGS. 6-7, the control handle 12 is located in a second position, the positioning pin spring 132 ejects the positioning pin 132 to enable the positioning pin 132 to be buckled with the second positioning pin groove 112, the sealant 131 still cake contact with the air inlet 111, and the vacuum cover 11 is in the airtight state; the convex point of the movable valve 21 slides into groove 134 of the cam 13, the movable valve spring 212 pushes the movable valve to slide upwards, the movable valve pad 211 makes contact with the stirring cup air hole 221, the stirring cup 22 is in the vacuum environment, and stirring can be conducted.

Figure 8:
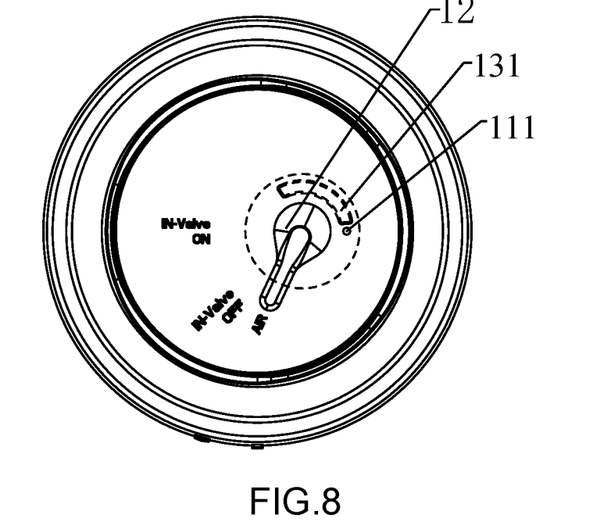
FIG. 8 is a top view of the vacuum cover assembly when the stirring cup is in the vacuum state and the vacuum cover is in the non-vacuum state.
Figure 9:
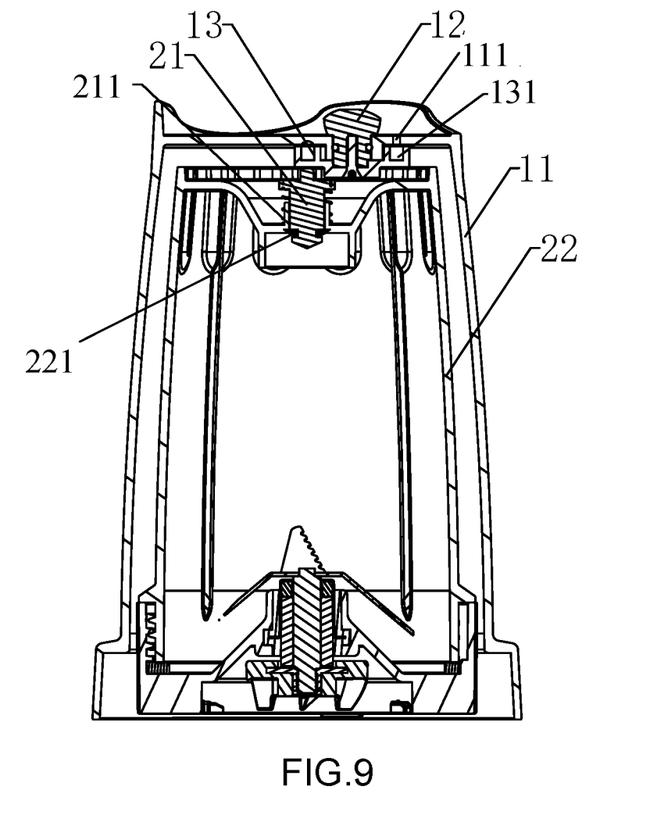
FIG. 9 is a sectional view of the vacuum cover assembly and the stirring cup assembly when the stirring cup is in the vacuum state and the vacuum cover is in the non-vacuum state.

As is shown in FIGS. 8-9, the control handle 12 is located in a third position, the positioning pin spring 133 ejects the positioning pin 132 to enable the positioning pin 132 to be buckled with the third positioning pin groove 122, the sealant 131 is separated from the air inlet 111, and the vacuum cover 11 is in the non-vacuum state; the convex point of the movable valve 21 is still located in the groove 134 of the cam 13, the stirring cup 22 is still in the vacuum state, and the stirring cup 22 can be taken down.

A motor and the like are arranged inside the main unit 30, a knife holder, blades and the like are arranged inside the stirring cup holder 23, these are all common technological means in the prior art, and unnecessary details are not given anymore.

It should be understood that for common technicians in the field, improvements or changes can be made according to the above description, and all the improvements and changes are included in the protection scope of the claims of the invention.

Illustrative description of the invention is given with the accompanying drawings, obviously, implementation of the invention is not limited by the above embodiment, and various improvements made according to the concept and technical scheme of the invention, or direct application of the concept and technical scheme of the invention to other occasions without improvement are all included in the protection scope of the invention.

What is claimed is:

1. A vacuum juicer, characterized by comprising a vacuum cover assembly, a stirring cup assembly and a main unit, wherein the stirring cup assembly is arranged inside the vacuum cover assembly in a sleeved mode; the vacuum cover assembly is movably connected with the main unit and comprises a vacuum cover and a cam arranged on the vacuum cover, the cam rotates around the vacuum cover, and a sealant is arranged on the cam and corresponds to an air inlet in the vacuum cover;

the stirring cup assembly comprises a stirring cup holder and a stirring cup, and a movable valve is arranged at a stirring cup air hole in the stirring cup and slides up and down to control opening and closing of the stirring cup air hole;

a vacuum pump is arranged inside the main unit and is in sealed connection with the internal space of the vacuum cover;

a control handle is arranged above the cam and drives the cam to rotate;

when the control handle is located at a first position, the sealant of the cam blocks the air inlet of the vacuum cover, and the movable valve slides downward to open the stirring cup air hole to provide communication between the stirring cup assembly and the vacuum cover assembly, such that both the stirring cup assembly and the vacuum cover assembly are vacuumed by the vacuum pump;

when the control handle is located at a second position, the sealant of the cam continues to block the air inlet of the vacuum cover, and the movable valve slides upward to close the stirring cup air hole, such that the stirring cup is closed for stirring;

when the control handle is located at a third position, the sealant of the cam stops blocking the air inlet of the vacuum cover, and the movable valve keeps closing the stirring cup air hole, such that the vacuum cover is in a non-vacuum state enabling removal of the same, while the stirring cup, still in a vacuum state, is taken down from the vacuum juicer.

2. The vacuum juicer according to claim 1, characterized in that a positioning pin is arranged on the cam, and a lower end of the positioning pin is connected with the cam through a positioning pin spring.

3. The vacuum juicer according to claim 2, characterized in that positioning pin grooves matched with the positioning pin are formed in the vacuum cover.

4. The vacuum juicer according to claim 1, characterized in that a movable valve spring is arranged on a lower side of the movable valve, a lower end of the movable valve spring is connected with the stirring cup, and the movable valve spring pushes the movable valve upwards, so that the movable valve and the cam are squeezed mutually.

5. The vacuum juicer according to claim 4, characterized in that the bottom of the cam is provided with an upward-concave groove and a downward-convex lug, and the lug is matched with a convex point at a top end of the movable valve.

6. The vacuum juicer according to claim 1, characterized in that the vacuum pump is connected with an internal space of the vacuum cover through a hose, and an air outlet is further formed in the vacuum pump.

* * * * *